(No Model.)
T. H. BUTLER.
DEVICE FOR FEEDING CHEMICALS TO FILTERS.
No. 461,235. Patented Oct. 13, 1891.
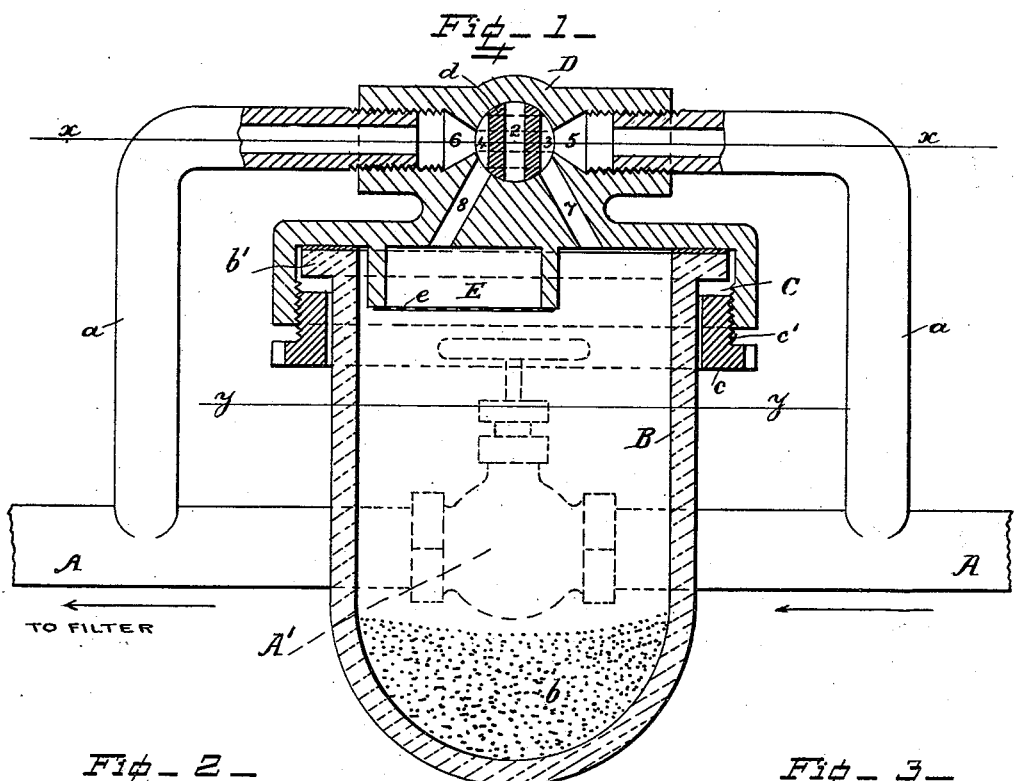
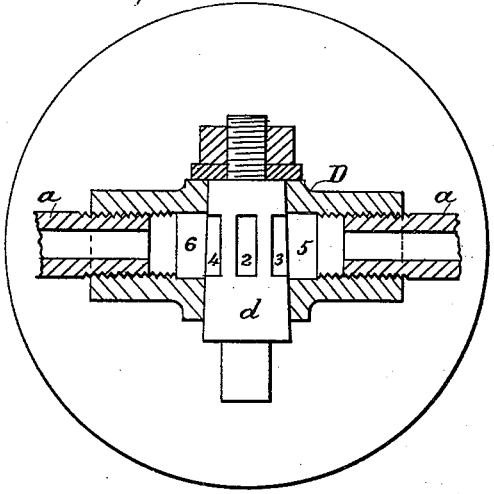
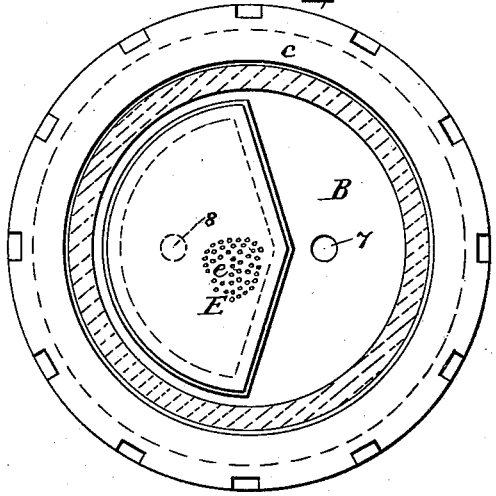
WITNESSES
Wm E. Harvey
Robert Stearns
INVENTOR
Thomas H. Butler
by Herbert W. T. Jenner, Attorney

UNITED STATES PATENT OFFICE.

THOMAS H. BUTLER, OF BALTIMORE, MARYLAND.

DEVICE FOR FEEDING CHEMICALS TO FILTERS.

SPECIFICATION forming part of Letters Patent No. 461,235, dated October 13, 1891.

Application filed February 25, 1891. Serial No. 382,780. (No model.)

*To all whom it may concern:*

Be it known that I, THOMAS H. BUTLER, a citizen of the United States, residing at Baltimore, in the State of Maryland, have invented certain new and useful Improvements in Devices for Feeding Chemicals to Filters; and I do hereby declare the following to be a full, clear, and exact description of the invention, such as will enable others skilled in the art to which it appertains to make and use the same.

This invention relates to apparatus for cleaning and disinfecting the filtering material inside filters without removing it from the filter; and it consists in the novel construction and combination of the parts hereinafter fully described and claimed.

In the drawings, Figure 1 is a longitudinal section through the apparatus. Fig. 2 is a sectional plan view taken on the line $x\,x$ in Fig. 1. Fig. 3 is a sectional plan view taken on the line $y\,y$ in Fig. 1.

A is the inlet-pipe, which leads to a filter, the water passing in the direction of the arrows in the drawings. When the filter is small, the cleaning devices may be secured direct to the inlet-pipe A; but when the filter is large the cleaning devices are preferably secured to a branch pipe $a$, as shown in Fig. 1, and an ordinary stop-valve A' is secured to the pipe A between the ends of the branch pipe, so that all the water may be caused to flow through the said branch pipe instead of flowing direct through the main pipe A.

B is a jar adapted to contain some chemical substance $b$, such as potash, soda, carbolic acid, or other substance which will clean or disinfect the filtering material of the filter. This jar B is preferably made of glass and is provided with a flange $b'$ around its upper end.

C is a socket in which the flange of the jar is inserted, and $c$ is a gland for securing the jar in the said socket. The gland has screw-threads $c'$, which engage with similar screw-threads inside the socket. This enables the jar to be readily removed from the socket, when desired, by unscrewing the gland; but the form of the gland is not material, as any gland of approved construction which will hold the jar connected to the socket may be used.

D is a three-way plug-valve at the top of the socket C. The plug $d$ of this valve is provided with a central passage 2 and side passages 3 and 4. The shell of the valve is provided with the passages 5 and 6, which communicate constantly with the pipe $a$, and with the passages 7 and 8, which communicate constantly with the inside of the jar B.

E is a strainer depending within the socket C and provided with perforate material $e$, which covers the end of the passage 8 inside the jar.

When the plug of the valve is turned as indicated by the dotted lines in the drawings, the water passes direct through the pipe $a$, passages 5 and 6, and through the passage 2 in the plug. When the filter is large, the water also passes direct through the pipe A and the valve A'; otherwise the pipe $a$ and its connections would have to be made much larger than desirable.

When the filtering material in the filter has become foul and require to be cleaned or disinfected, the plug $d$ is turned as shown in full lines in the drawings. The water then passes through the passages 3 and 7 into the jar and becomes impregnated with the chemicals contained in the jar. The solution then passes through the strainer and through the passages 8 and 4 to the filter. When a sufficient quantity of chemical solution has been passed through the filter to clean or disinfect the filtering material, the plug $d$ is turned to its original position. The strainer prevents the chemical substance in the jar from being washed out in too great a quantity and without being dissolved by the water.

What I claim is—

1. The combination, with the shell of the valve, provided with the passages 5 6 and 7 8 and adapted to be secured to the inlet-pipe of a filter, of a jar adapted to contain a chemical substance and connected with the said passages 7 and 8, and the plug provided with the passages 2 3 4, whereby the water may be passed into the filter direct through the inlet-pipe and the central passage 2 of the plug or indirectly through the said jar and the passages 7 and 8, substantially as set forth.

2. The combination, with the jar provided with a flange around its upper end, of the socket provided with the passages 7 and 8 and adapted to receive the said flange, a gland for retaining the flange in the said socket, a strainer covering the passage 8 inside the socket, and a three-way plug-valve secured to the socket and adapted to pass the current of liquid through the said jar, substantially as and for the purpose set forth.

In testimony whereof I affix my signature in presence of two witnesses.

THOMAS H. BUTLER.

Witnesses:
WM. H. JONES,
CHAS. J. CARY.